S. HULBERT.
Plow.
No. 10,031.
Patented Sept. 20, 1853.
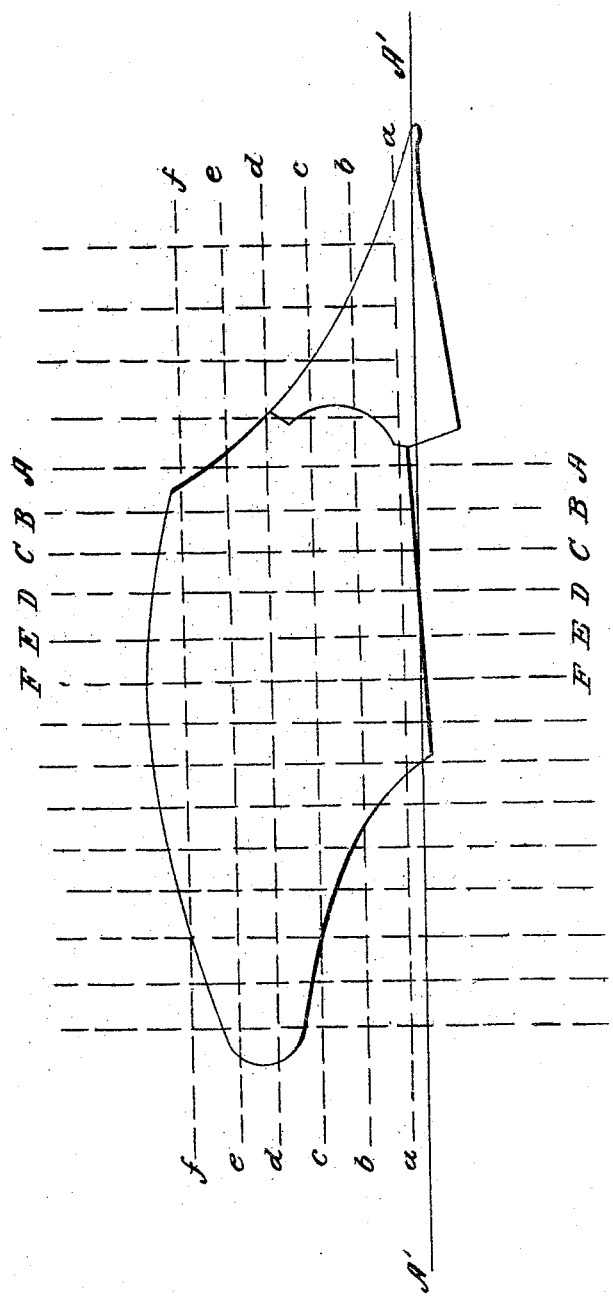

UNITED STATES PATENT OFFICE.

SAMUEL HULBERT, OF OGDENSBURG, NEW YORK.

IMPROVEMENT IN PLOWS.

Specification forming part of Letters Patent No. 10,031, dated September 20, 1853.

*To all whom it may concern:*

Be it known that I, SAMUEL HULBERT, of the village of Ogdensburg, county of St. Lawrence, State of New York, have invented various Improvements in Agricultural Plows; and I do hereby declare that the following is a full and exact description of the same.

The nature of my invention consists in constructing the working side of the mold-board of a plow uniformly convex from front to rear, and also convex from top to bottom, so that a concave arc of a circle, when applied to the mold-board horizontally, will fit in every part, and a concave arc of a circle, when applied vertically to the line of the base, shall also adapt itself to every part of the said mold-board, the mold-board being so curved as to turn the furrow-slice.

The advantages gained in the use of such a mold-board are, first, the plow is capable of cutting deeper than other plows which are constructed upon the concave or hollow shape, without being under the necessity of increasing the width of the plow. The front edge, or that part of the mold-board and the point, runs very obliquely upward and backward and extends back from the cutting-point some six inches more than is usual in other plows, which gives the plow an advantage of keeping in or of not being so easily thrown out of the ground by stones, and also the upper part of the mold-board offers no more resistance to the furrow than any other part of the same. Consequently the shape of the furrow is not altered or rubbed off by any abruptness in the upper part of the mold-board. The plow is also thereby better adapted to various kinds of plowing—for stubble, sod, and subsoil.

The second advantage is the uniform convex shape from or near the first cutting-point. Continuing the same throughout to the end of the mold-board, effectually prevents the adhesion of the earth to it.

For a better description of which reference is had to the accompanying drawing.

A′ A′ is a base line. Then on applying a concave arc of a circle at A A B B C C, and so on vertically or cross-sectionally to the base A′ A′, the arc will adapt itself in every part to the mold-board, and that a concave arc when applied horizontally at $a\ a\ b\ b\ c\ c$, and so on, shall also adapt itself to every part of the mold-board.

What I claim as my invention, and desire to secure by Letters Patent, is—

Constructing a mold-board of a plow so that a horizontal line drawn at any height across its working side shall describe the convex arc of a given circle, and any line drawn across its working side at right angles to the base shall also describe the convex arc of a circle, substantially as set forth.

SAML. HULBERT.

Witnesses:
S. H. PLATT,
ISAAC N. COFFIN.